United States Patent [19]
Jex et al.

[11] Patent Number: 5,598,113
[45] Date of Patent: Jan. 28, 1997

[54] FULLY ASYNCHRONOUS INTERFACE WITH PROGRAMMABLE METASTABILITY SETTLING TIME SYNCHRONIZER

[75] Inventors: Jerry Jex, Forrest Grove; Charles Dike, Hillsboro; Keith Self, Aloha, all of Oreg.

[73] Assignee: Intel Corporation, Santa Clara, Calif.

[21] Appl. No.: 375,361

[22] Filed: Jan. 19, 1995

[51] Int. Cl.$^6$ .......................... H03K 19/00; H03K 5/135
[52] U.S. Cl. .......................... 326/94; 327/141; 327/154; 327/163
[58] Field of Search .................. 326/93–94; 327/152, 327/154, 162–163, 141

[56] References Cited

U.S. PATENT DOCUMENTS

| | | | |
|---|---|---|---|
| 4,891,808 | 1/1990 | Williams | 327/141 |
| 5,014,226 | 5/1991 | Horstmann et al. | 326/94 |
| 5,056,120 | 10/1991 | Taniguchi et al. | 327/141 |
| 5,321,368 | 6/1994 | Hoelzle et al. | 326/93 |

*Primary Examiner*—Edward P. Westin
*Assistant Examiner*—Jon Santamauro
*Attorney, Agent, or Firm*—Blakely, Sokoloff, Taylor & Zafman

[57] ABSTRACT

A fully asynchronous parallel synchronizer having staged write and read enables and an asynchronous interface for same. The asynchronous interface can be used to interconnect two processor systems (e.g., within a multiple processor system or a parallel processor system). The parallel programmable synchronizer contains n latches coupled in parallel having n individual enable lines having staggered enable signals. The latches are coupled such that they output to a multiplexing circuit that also receives individual staggered read enable signals which are based on the write enable signals. According to the parallel programmable synchronizer, data is written into a particular latch in clock cycle (i) just after other data was read from the same particular latch in a just prior clock cycle (i-1). While the synchronizer contains n latches, the number of latches used, x, for any particular embodiment is programmable and the enable signals adjust to accommodate the number of latches selected. The settling time for the synchronizer is therefore programmable while the synchronizer also provides a maximum throughput frequency (sampling rate). A novel empty flag generation is also described.

19 Claims, 15 Drawing Sheets

| CLOCK CYCLE | 0 | 1 | 2 | 3 | 4 | 5 | 6 | 7 | 8 | 9 | 10 | 11 | |
|---|---|---|---|---|---|---|---|---|---|---|---|---|---|
| | | | | SETTLE = 3 CYCLES | | | | | $L_0=1$ | | $L_1=1$ | | |
| EN$_1$ | W | | | | W | | | | W | | | | 601 |
| EN$_2$ | | W | | | | W | | | | W | | | 603 |
| EN$_3$ | | | W | | | | W | | | | W | | 605 |
| EN$_4$ | | | | W | | | | W | | | | W | 607 |
| I$_A$ | | | | R | | | | R | | | | R | 609 |
| I$_B$ | R | | | | R | | | | R | | | | 611 |
| I$_C$ | | R | | | | R | | | | R | | | 613 |
| I$_D$ | | | R | | | | R | | | | R | | 615 |
| S$_1$ | 0 | 0 | 0 | 1 | 0 | 0 | 0 | 1 | 0 | 0 | 0 | 1 | 617 |
| S$_2$ | 1 | 0 | 0 | 0 | 1 | 0 | 0 | 0 | 1 | 0 | 0 | 0 | 619a |
| S$_3$ | 0 | 1 | 0 | 0 | 0 | 1 | 0 | 0 | 0 | 1 | 0 | 0 | 619b |
| S$_4$ | 0 | 0 | 1 | 0 | 0 | 0 | 1 | 0 | 0 | 0 | 1 | 0 | 619c |
|  |  |  |  |  |  |  |  |  |  |  |  |  | 619d |

FIG. 6A

| CLOCK CYCLE | 0 | 1 | 2 | 3 | 4 | 5 | 6 | 7 | 8 | 9 | 10 | 11 | |
|---|---|---|---|---|---|---|---|---|---|---|---|---|---|
| EN₁ | W |   |   | W |   |   | W |   |   | W |   |   | 601 |
| EN₂ |   | W |   |   | W |   |   | W |   |   | W |   | 603 |
| EN₃ |   |   | W |   |   | W |   |   | W |   |   | W | 605 |
| I_A |   |   | R |   |   | R |   |   | R |   |   | R | 607 |
| I_B | R |   |   |   |   | R |   |   | R |   |   | R | 611 |
| I_C |   |   |   | R |   |   | R |   |   | R |   |   | 613 |
| S₁ | 0 | 0 | 1 | 0 | 0 | 1 | 0 | 0 | 1 | 0 | 0 | 1 | 615 |
| S₂ | 1 | 0 | 0 | 1 | 0 | 0 | 1 | 0 | 0 | 1 | 0 | 0 | 619a |
| S₃ | 0 | 1 | 0 | 0 | 1 | 0 | 0 | 1 | 0 | 0 | 1 | 0 | 619b |
|    |   |   |   |   |   |   |   |   |   |   |   |   | 619c |
| EN₄ |   |   |   |   |   | INACTIVE | INACTIVE |   |   |   |   |   | 609 |
| I_D |   |   |   |   |   |   |   |   |   |   |   |   | 617 |

Column group headers: CLOCK CYCLE | SETTLE = 2 CYCLES | L₀ = 0 | L₁ = 1

FIG. 6B

| CLOCK CYCLE | 0 | 1 | 2 | 3 | 4 | 5 | 6 | 7 | 8 | 9 | 10 | 11 | 0 | |
|---|---|---|---|---|---|---|---|---|---|---|---|---|---|---|
| | | | | | SETTLE = 1 CYCLE | | | | | $L_0 = 0$ | | $L_1 = 0$ | | |
| $EN_1$ | W | | W | | W | | W | | W | | W | | | 601 |
| $EN_2$ | | W | | W | | W | | W | | W | | W | | 603 |
| $I_A$ | | R | | R | | R | | R | | R | | R | | 605 |
| $I_B$ | R | | R | | R | | R | | R | | R | | | | 611 |
| $S_1$ | 0 | 1 | 0 | 1 | 0 | 1 | 0 | 1 | 0 | 1 | 0 | 1 | | 613 |
| $S_2$ | 1 | 0 | 1 | 0 | 1 | 0 | 1 | 0 | 1 | 0 | 1 | 0 | | 619a |
| | | | | | | | | | | | | | | 619b |
| $EN_3$ | | | | | | INACTIVE | | | | | | | | 607 |
| $EN_4$ | | | | | | INACTIVE | | | | | | | | 609 |
| $I_C$ | | | | | | INACTIVE | | | | | | | | 615 |
| $I_D$ | | | | | | INACTIVE | | | | | | | | 617 |

FIG. 6C

| CLOCK CYCLE | 0 | 1 | 2 | 3 | 4 | 5 | 6 | 7 | 8 | 9 | 10 | 11 | |
|---|---|---|---|---|---|---|---|---|---|---|---|---|---|
| | | | | | | TRANSPARENT | | | | | $L_0 = 0$ | $L_1 = 0$ | |
| $E_1$ | W | W | W | W | W | W | W | W | W | W | W | W | 601 |
| $I_A$ | R | R | R | R | R | R | R | R | R | R | R | R | 603 |
| $S_1$ | 1 | 1 | 1 | 1 | 1 | 1 | 1 | 1 | 1 | 1 | 1 | 1 | 611 |
| | | | | | | | | | | | | | 619a |
| $EN_2$ | | | | | | INACTIVE | INACTIVE | | | | | | 605 |
| $EN_3$ | | | | | | INACTIVE | INACTIVE | | | | | | 607 |
| $EN_4$ | | | | | | INACTIVE | INACTIVE | | | | | | 609 |
| $I_B$ | | | | | | INACTIVE | INACTIVE | | | | | | 613 |
| $I_C$ | | | | | | INACTIVE | INACTIVE | | | | | | 615 |
| $I_D$ | | | | | | INACTIVE | INACTIVE | | | | | | 617 |

FIG. 6D

FULLY ASYNCHRONOUS INTERFACE WITH PROGRAMMABLE METASTABILITY SETTLING TIME SYNCHRONIZER

BACKGROUND OF THE INVENTION (1) Field of the Invention

The present invention relates to the field of data interfaces between asynchronously clocked systems. Specifically, the present invention relates to interfaces for the transfer and reception of information between such systems.

(2) Prior Art

A problem encountered with the transmission and reception of valid data between two asynchronous systems is metastability of electronic device signals. The communicated data is truly asynchronous with respect to the receiving clock when it meets two criteria: (1) there is no known phase relationship (one does not know when the signal will change); and (2) there is no known frequency relationship (one does not know how often the signal will change).

Metastability is the act of transitioning into a relatively unstable state of a flip-flop or latch. In this state, the set-up and hold times are violated so that the data input is not a clear one or zero. This causes a finite chance that the flip-flop will not immediately latch a high or a low signal but get impermissibly caught halfway in between. A synchronization failure occurs when the undefined output is sampled by other digital circuitry and propagates through binary systems. A system is not extremely reliable without providing a way to establish the limits of its probability of failure.

Once the flip-flop enters the metastable state, the probability that it will still be metastable some time later has been shown to be an exponentially decreasing function which determines the mean time before failure (MTBF):

$$MTBF = \frac{e^{(t'/t)}}{ToFcFi}$$

Where t' is the metastability settling time, Fc is the clock sampling frequency, To is the propensity for metastability, Fi is the input event frequency and t is the exponential decay rate that indicates how long a device is expected to remain in a metastable state once placed there. It is desired to utilize an interface wherein the MTBF is very high and can be accurately determined within the system. The MTBF is typically increased by decreasing the sampling rate (Fc). Unfortunately, decreasing the sampling rate (Fc) directly increases the latency of data through the synchronizer. It is preferred to maximize the settling time (t') for a given sampling rate. Settling time (t') is the time allowed for a synchronized signal to remain at rest before being evaluated.

Interfacing with data streams which are asynchronous to the VLSI component has always been a problem. Reducing metastability failures without adding latency is becoming more difficult as clock rates continue to increase. For instance, it is desired that parallel processor interconnect synchronization be done in a way that will not reduce data path bandwidth. It is desired to utilize an interface allowing maximum throughput sampling rate.

In the past, several prior art synchronizer designs have been utilized to provide an interface (e.g., integrated within the overall interface electronics) between two asynchronous systems. One such cascaded synchronizer is shown in FIG. 1. This circuit is composed of n+1 cascaded stages (latches 30a–30d) to obtain a delay of approximately n clock cycles of sample clock 35 before the status bit of line 15 is sampled by the receiver system at point 20. Clock 35 is the sampling clock (also called the read clock or receiver clock). Each stage (30a to 30d) provides additional settling time of the status signal 15. During the settling time, a marginal value has the opportunity to resolve to a valid logic level. The amount of settling time desired is selected as a function of the input data and clock frequencies, synchronizer characteristics, and desired MTBF failure rate. Within the circuit of FIG. 1, a synchronized signal will transverse through each synchronizer stage. Propagation delay through each stage reduces the total settling time because the synchronized signal is not at rest during propagation.

The circuit of FIG. 1 specifically shows four serial stages each clocked by signal 35 over line 10. The output data is sampled over line 20. The status bit over line 15 (e.g., from the writing or sending system) is shifted from one stage to the next until it reaches the end. Each stage will add an additional clock cycle of settling time minus the propagation time required for the status bit to pass through the stage. The total settling time for four serial stages is approximately three clock periods minus four propagation delays (one for each stage). For example, at clock frequencies of 200 MHz, and propagation delays of 1 nsec, the total settling time of FIG. 1 is 11 nsecs. Therefore, the four propagation delays reduce the maximum possible settling time by 26% according to:

$$MTBF = \frac{e^{[(3t\_clk - 4t\_prop)/t]}}{ToFcFi}$$

FIG. 2 illustrates another prior art synchronizer having a divided sample clock and a single stage. This circuit contains a single stage latch 40a with divided clock enable and provides more settling time per clock cycle over the serial staged synchronizer (FIG. 1) because the synchronized signal has only one propagation delay per n clock cycles, where n is the divided clock parameter (signal 22). The output data is taken (sampled) over line 20 and is input over line 15. The clock signal 35 is divided by three by the latches 40b–40d and used as an enable signal over line 22 to latch 40a. For example, at clock frequencies of 200 MHz and propagation delays of 1 nsec, the total settling time is 9 nsec. This is a 28% improvement over the cascaded synchronizer of FIG. 1. The MTBF of FIG. 2 is expressed as:

$$MTBF = \frac{e^{[(2t\_clk - 1t\_prop)/t]}}{ToFcFi}$$

However, the divided clock requires that the asynchronous input stream be sampled with a slower clock frequency than the maximum sample frequency. This reduces the system communication throughput considerably and is undesirable in a parallel processor interconnect. As such, it is desirable to provide an asynchronous interconnect or interface that does not require a divided sampling clock but can rather operate a maximum throughput sampling clock speed.

Synchronizers, such as the above, can be implemented within communication interconnects for providing an interface between two asynchronous systems. In these systems, an empty flag is often generated to indicate that the interconnect (interface) is empty of valid data. Prior art interconnects synchronize both the assertion and deassertion of the empty flag. Serial or cascaded synchronizer stages cannot be reset since pending information is lost in all stages simultaneously. Typical asynchronous interfaces solve the empty flag problem by generating an "almost-empty" flag or signal. The almost-empty signal warns that only a small amount of data resides in the FIFO and reading of the FIFO should be discontinued to prevent reading after the FIFO is empty. The disadvantage to this is that a small amount of data may be left stuck in the FIFO until more data forces deassertion of the almost-empty flag. Throughput is degraded in order to remove the last data from the almost-empty FIFO. It would be desirable to provide a more efficient mechanism for indicating FIFO empty.

Accordingly, it is an object of the present invention to provide an interface between two asynchronous systems. It is further an object of the present invention to provide such interface wherein the interface operates at maximum throughput clock speed and does not require clock dividing. It is yet another object of the present invention to provide such interface that can offer a proportionately large settling time per clock cycle. It is also an object of the present invention to provide such an interface that has a programmable settling time. It is also an object of the present invention to provide a more efficient FIFO empty notification to a receiving system. These and other objects of the present invention not specifically recited above will become clear within discussions of the present invention herein.

SUMMARY OF THE INVENTION

A fully asynchronous parallel synchronizer is described having staged write and read enables and an asynchronous interface for same is also described. The asynchronous interface can be used to interconnect two processor systems (e.g., within a multiple processor system or a parallel processor system). The parallel programmable synchronizer contains n latches coupled in parallel having n individual enable lines having staggered enable signals. The latches are coupled such that they output to a multiplexing circuit that also receives individual staggered read enable signals which are based on the write enable signals. According to the parallel programmable synchronizer, data is written into a particular latch in clock cycle (i) just after other data was read from the same particular latch in a just prior clock cycle (i-1). While the synchronizer contains n latches, the number of latches used, x, for any particular embodiment is programmable and the enable signals adjust to accommodate the number of latches selected. The settling time for the synchronizer is therefore programmable while the synchronizer also provides a maximum throughput frequency (sampling rate). A novel empty flag generation is also described.

Specifically, embodiments of the present invention include a synchronizer having programmable metastability settling time for synchronizing an input signal according to a sample clock, the synchronizer comprising: a plurality of n latches, each latch for receiving the input signal in parallel and each latch clocked by the sample clock in parallel; a multiplexing circuit for receiving n outputs originating from the plurality of n latches, the multiplexing circuit responsive to read enable signals for outputting one of the n outputs for sampling; write enable circuitry for generating write enable signals, the write enable signals coupled to the plurality of n latches, wherein the write enable circuitry receives program signals and in response thereto generates the write enable signals such that x number of latches, of the plurality of n latches, are used wherein x is equal to or less than $4c$; and wherein for a given sample clock cycle the write enable signals enable a single write latch, of the plurality of n latches, for receiving the input signal and the read enable signals enable a single read latch, of the plurality of n latches, for outputting through the multiplexing circuit and further comprising read enable circuitry for generating the read enable signals wherein the read enable signals are functions of the write enable signals.

Embodiments of the present invention include the above and wherein the write enable signals and the read enable signals are generated such that a given latch of the plurality of n latches is written into one sample clock cycle after the given latch was read from through the multiplexing circuit and wherein the circuit provides $4c-1$ sample clock cycles of metastability settling time for every x number of latches programmed to be used.

Embodiments of the present invention include a communication interconnect circuit for providing communication between a system clocked by a read clock and a system clocked by a write clock wherein the read clock and the write clock are asynchronous, the circuit comprising: a FIFO memory circuit containing addressable locations for storing data; a write pointer indicating a next write location of the FIFO memory circuit; a read pointer indicating a next read location of the FIFO memory circuit; a status register containing a bit for each addressable location of the FIFO, the status register coupled to the write pointer and coupled to the read pointer; a FIFO empty circuit for generating a first signal indicative of the FIFO memory circuit being empty and for generating a second signal indicative of the FIFO memory circuit not being empty wherein assertion of the first signal is immediate after a read of the last data of the FIFO memory circuit to prevent an over read condition and wherein assertion of the second signal is synchronized to the read clock wherein bits of the status register are set synchronized by the write clock and wherein bits of the status register are reset synchronized by the read clock.

Embodiments of the present invention include the above and wherein the FIFO empty circuit comprises: a plurality of read synchronizer circuits coupled to the status register and synchronized by the read clock wherein each read synchronizer circuit receives as input a corresponding status register bit and wherein a given read synchronizer circuit is reset upon reset of its corresponding bit of the status register; and a first logic gate coupled to receive outputs of the plurality of read synchronizer circuits, the first logic gate for generating the first signal and the second signal.

BRIEF DESCRIPTION OF THE DRAWINGS

FIG. 6A is a timing diagram illustrating the states of the write enable lines, the selected input lines to the multiplexer and the select lines for the embodiment of FIG. 4 wherein all four latches (stages) are selected.

FIG. 6B is a timing diagram illustrating the states of the write enable lines, the selected input lines to the multiplexer and the select lines for the embodiment of FIG. 4 wherein only three latches are selected.

FIG. 6C is a timing diagram illustrating the states of the write enable lines, the selected input lines to the multiplexer and the select lines for the embodiment of FIG. 4 wherein only two latches are selected.

FIG. 6D is a timing diagram illustrating the states of the write enable lines, the selected input lines to the multiplexer and the select lines for the embodiment of FIG. 4 wherein only one latch is selected.

DETAILED DESCRIPTION OF THE INVENTION

In the following detailed description of the present invention numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

PARALLEL SYNCHRONIZER

Figure 1:
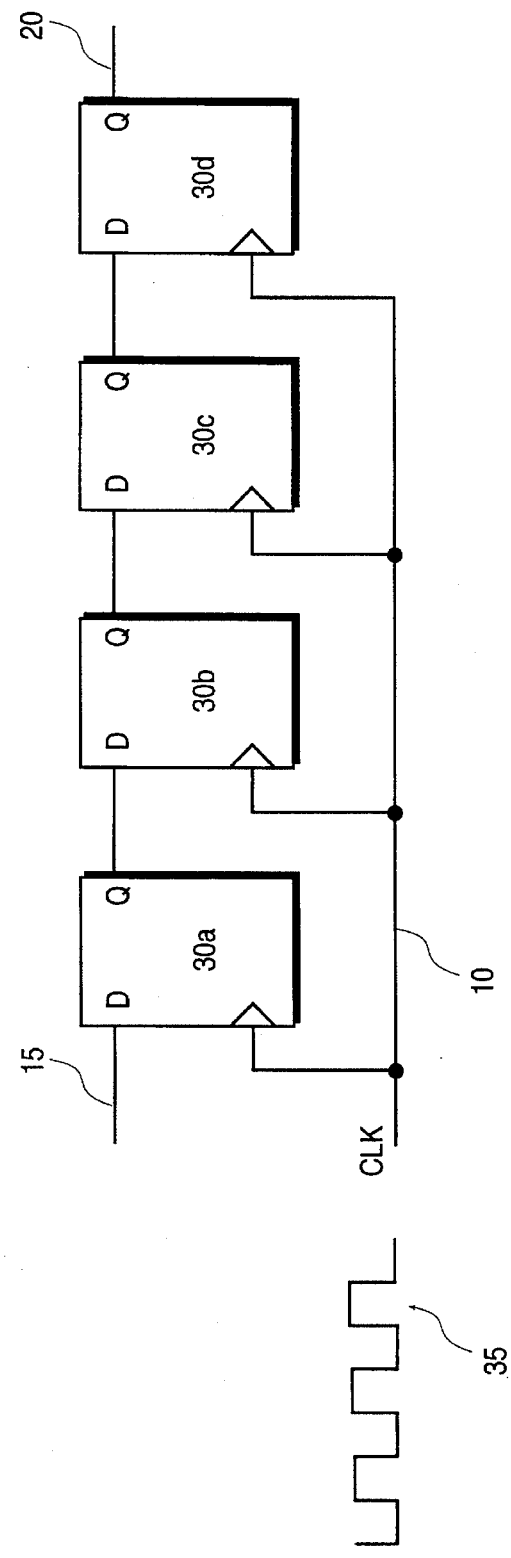
FIG. 1 illustrates a prior art serial synchronizer having cascaded synchronizer stages.
Figure 3:
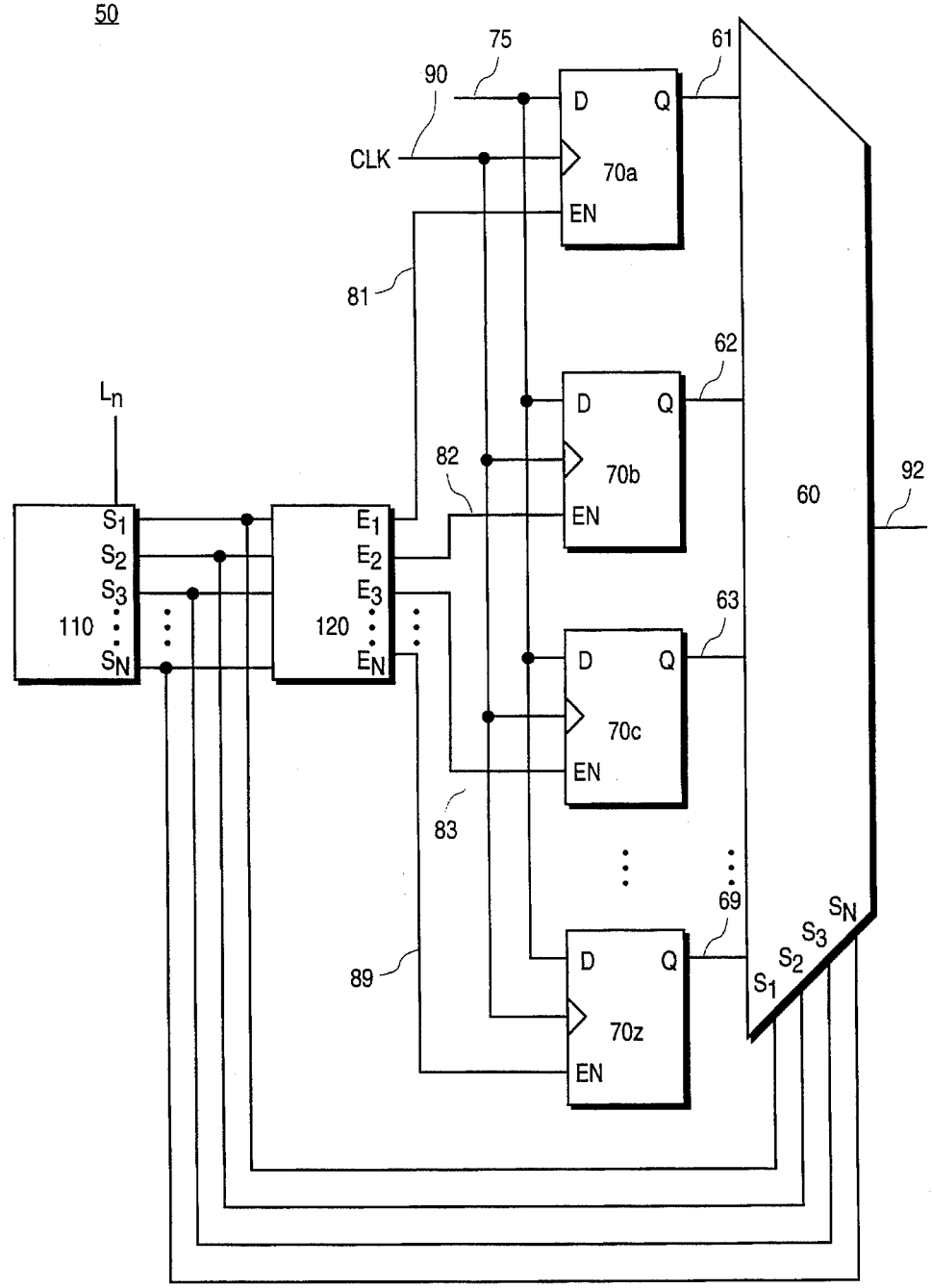
FIG. 3 illustrates the present invention programmable parallel fully asynchronous synchronizer having up to n parallel stages.

FIG. 3 illustrates a parallel programmable synchronizer 50 of one embodiment of the present invention. This embodiment provides maximum metastability settling time with minimum clock cycle latency. In effect, the signal for synchronization 75 transverses through only one synchronizer stage, therefore, propagation delay through one stage does not reduce the total settling time as much as accumulative delay through multiple stages (e.g., the prior art implementation of FIG. 1). Further, the sampling clock 90 is not divided and therefore the circuit 50 of the present invention can operate at maximum throughput clock speed. As shown in FIG. 3, any number of latch stages (n) can be added in parallel. Given a particular implementation of stages (e.g., a particular value for n) any number of the n stages can also be programmed by circuit 110 to be operable (this number is x). As such, circuit 50 offers programmable metastability.

In order to reap the benefits of a longer settling time and reduced propagation delay, the plurality of latches (70a–70z) of the circuit 50 hold the stored status bit (over line 75) stationary when not enabled. This is done with a cross-coupled inverter latch commonly called a "jamb latch." However, any number of non-recycling latches can be used.

As discussed further below, the circuit 50 of the present invention provides parallel stages that effectively sample at slower frequencies, but banks of the latches allow the data to be sampled at the maximum frequency and provide maximum throughput.

Particularly, parallel synchronizer 50 of FIG. 3 comprises a set of n latches 70a–70z wherein the inputs, D, and clock inputs of each latch are coupled in parallel. Signal line 75 is coupled to each D input and clock line 90 is coupled to each clock input. The output, Q, of each latch 70a–70z is coupled to a multiplexer 60 via individual output lines 61, 62, 63 . . . 69. The multiplexer 60 has select inputs (S1, S2, S3 . . . Sn) that select the appropriate input (e.g., from latches 70a–70z) for output over synchronized line 92. The clock of each latch is individually enabled by a separate enable signal carried over lines 81, 82, 83 . . . 89. The enable signals (E1–En) are arranged so that only one latch stage is enabled per clock cycle. The outputs, Q, of the latches are enabled for reading through the mux 60 (e.g., via lines S1–Sn) with a similar signal except that the corresponding output enable appears one cycle earlier in time. The decoding required to perform this can be located in a separate circuit 120 which is essentially, in one embodiment, a one cycle delay circuit of the select lines (S1–Sn). The select lines (S1–Sn) are generated via a circuit 110 which can be implemented as a well-known ring counter with a programmable ring size.

For example, enable 1 (over line 81) captures the status bit (over line 75) in the first stage (latch 70a) while simultaneously the mux 60 is enabled to output the contents of the second parallel stage (latch 70b). In the parallel synchronizer (latch) stages, the status bit is loaded into one latch stage and stays there until it is read one cycle before a new status bit is written into the same stage. The total time for n parallel stages is approximately n-1 clock cycles minus one propagation delay and minus one mux delay. As discussed further below, an embodiment of the parallel synchronizer 50 having n parallel stages is programmable in that any number of stages less than n (e.g., x) can be used at any given time by appropriate setting of the enable lines 81, 82, 83 . . . 89. Since the settling time is based on the number of stages used, the circuit 50 effectively offers a programmable settling time.

Figure 4:
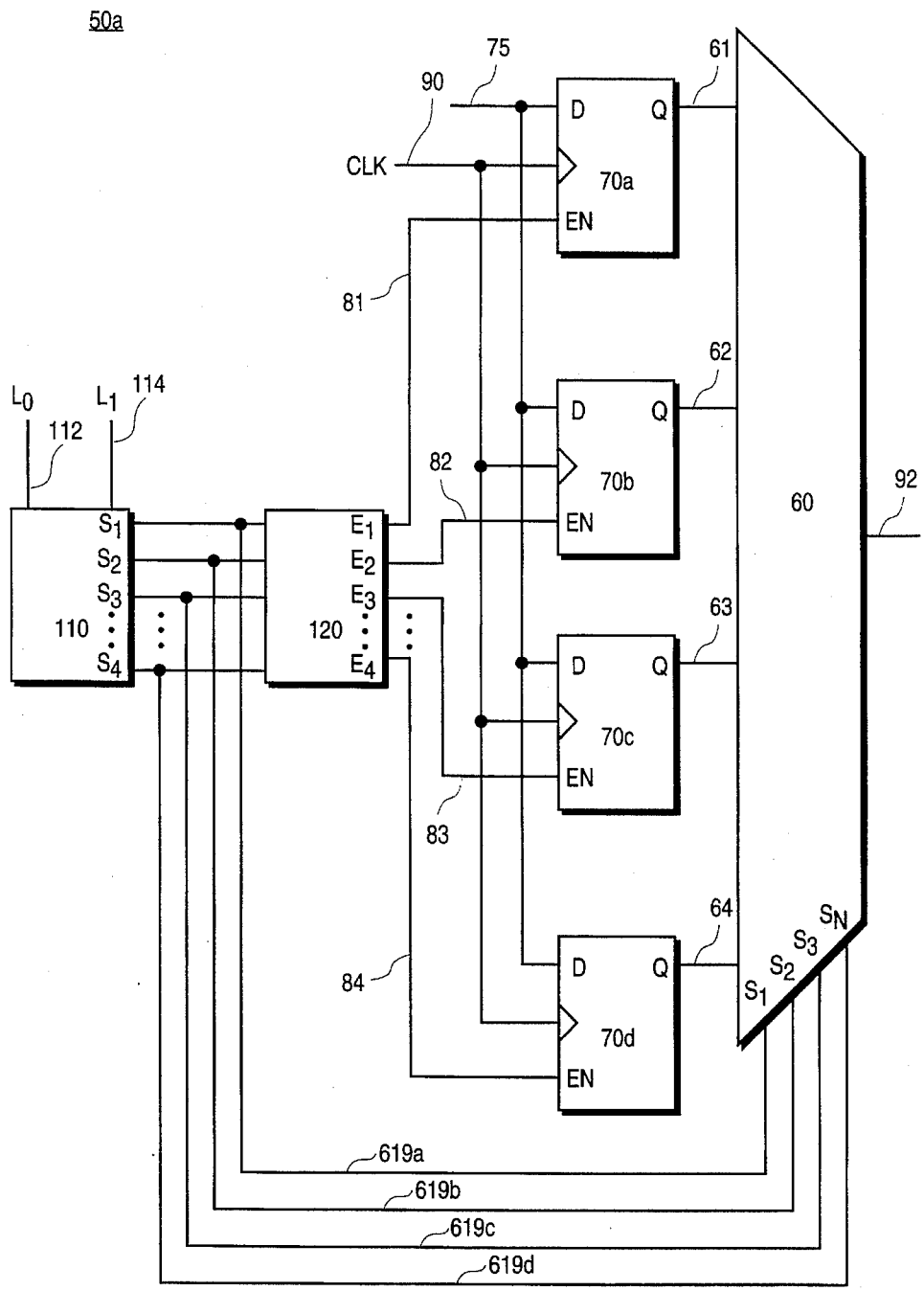
FIG. 4 is an illustration of an exemplary embodiment of the present invention programmable parallel fully asynchronous synchronizer having a maximum of 4 parallel stages (e.g., n=4).

FIG. 4 illustrates a particular embodiment 50a of the circuit 50 of FIG. 3 having a maximum of four stages (latch circuits 70a–70d). Circuit 50a also contains a control circuit 110 for receiving two signals L0 112 and L1 114 for programming circuit 110 with the number of parallel stages desired (e.g., activated) from 1 to 4. Effectively, circuit 50a offers a programmable settling time of three, two, one or zero clock cycles. The mux read enable signals (S1, S2, S3, and S4) are generated by circuit 110 in response to different signal patterns applied at inputs 112 and 114 which will be discussed further below. Circuit 110 generates mux enable signals over lines (S1, S2, S3, and S4) which are coupled to a one cycle delay circuit 120 which delays these signals by one cycle. Circuit 110, in one embodiment, is a ring counter with programmable length and will cycle a bit through each select line so that only one signal is active within any given clock cycle. Delay circuit 120 generates the latch or write enable lines 81, 82, 83, and 84 which are coupled to the clock enable inputs of latches 70a to 70d. The Q outputs of each latch 70a to 70d are coupled to inputs Ia–Id, respectively, of mux 60 via lines 61–64 as shown. The status bit (e.g., from the writing unit) is input over line 75 and is coupled in parallel to the D input of each latch 70a–70d. Similarly, the sampling clock (from the reading unit) is coupled via line 90 to the clock inputs of each latch 70a–70d in parallel.

The read enable signals (S1, S2, S3 and S4) are coupled from circuit 120 to the select inputs of the mux 60 via lines 619a–619d. Only one latch stage (of latches 70a–70d) is read per clock cycle. As will be shown to follow, the write enable lines 81–84 are configured to write data into a particular latch stage one clock cycle after that same stage was read by the mux 60 via the read enable lines (S1, S2, S3, and S4).

Figure 2:
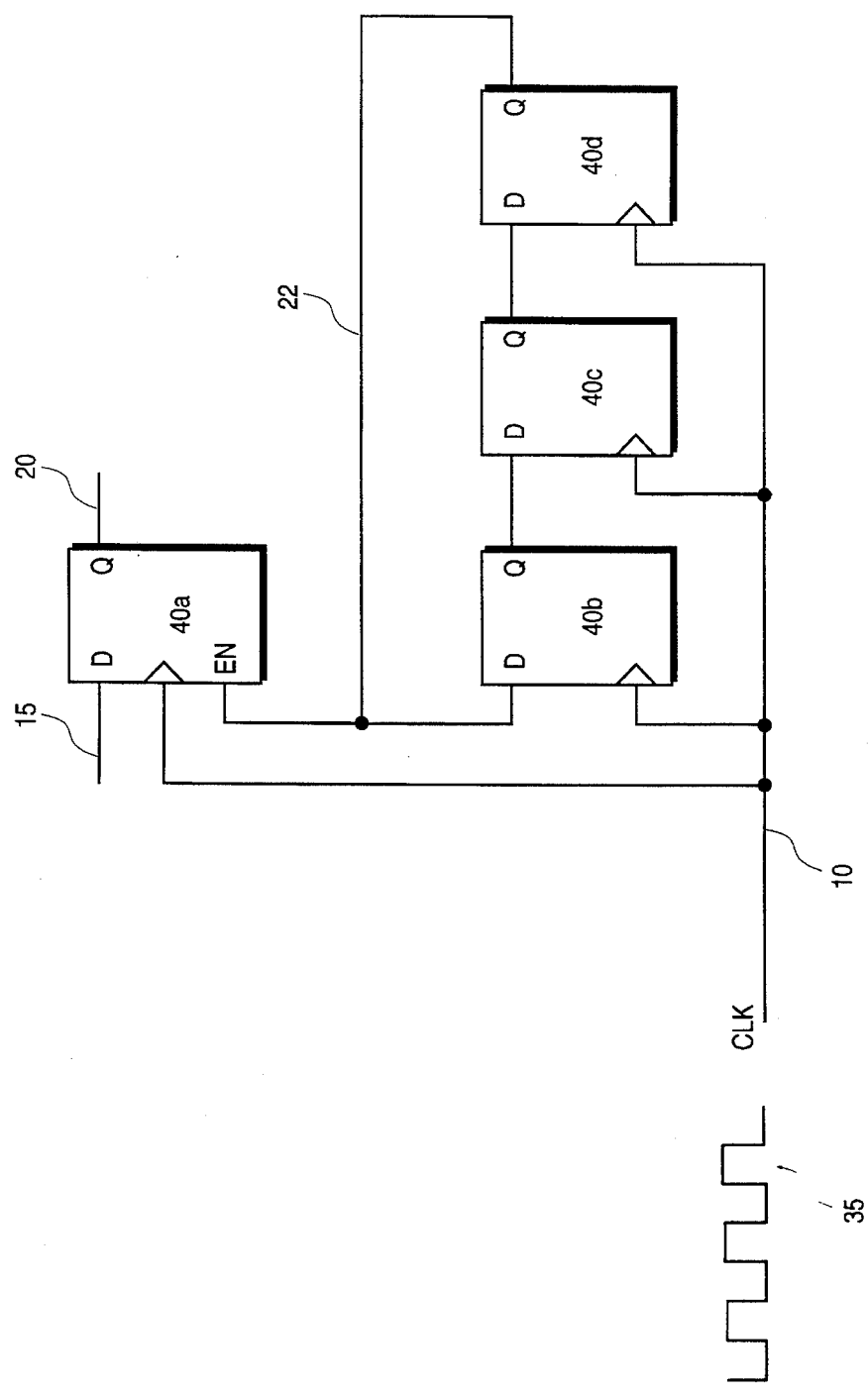
FIG. 2 illustrates a prior art single stage synchronizer with divided clock enable.

Using exemplary settings for comparison purposes, at clock frequencies of 200 MHz, propagation delays of 1 nsec, and a mux delay of 0.5 nsec, the total settling time for the synchronizer circuit 50a of the present invention is 8.5 nsec. This is a 21% improvement over the prior art cascading synchronizer of FIG. 1 while at the same time avoiding the requirement of dividing the sampling clock as done by the prior art synchronizer of FIG. 2. The present invention sequencer 50a is therefore advantageous within a parallel processing interconnect since it operates a maximum throughput clock speed. The MTBF for the present invention parallel programmable sequencer of FIG. 4 is shown below:

$$MTBF = \frac{e^{[(2t\_clk - 1t\_prop - 1t\_mux)/t]}}{ToFcFi}$$

Figure 5:
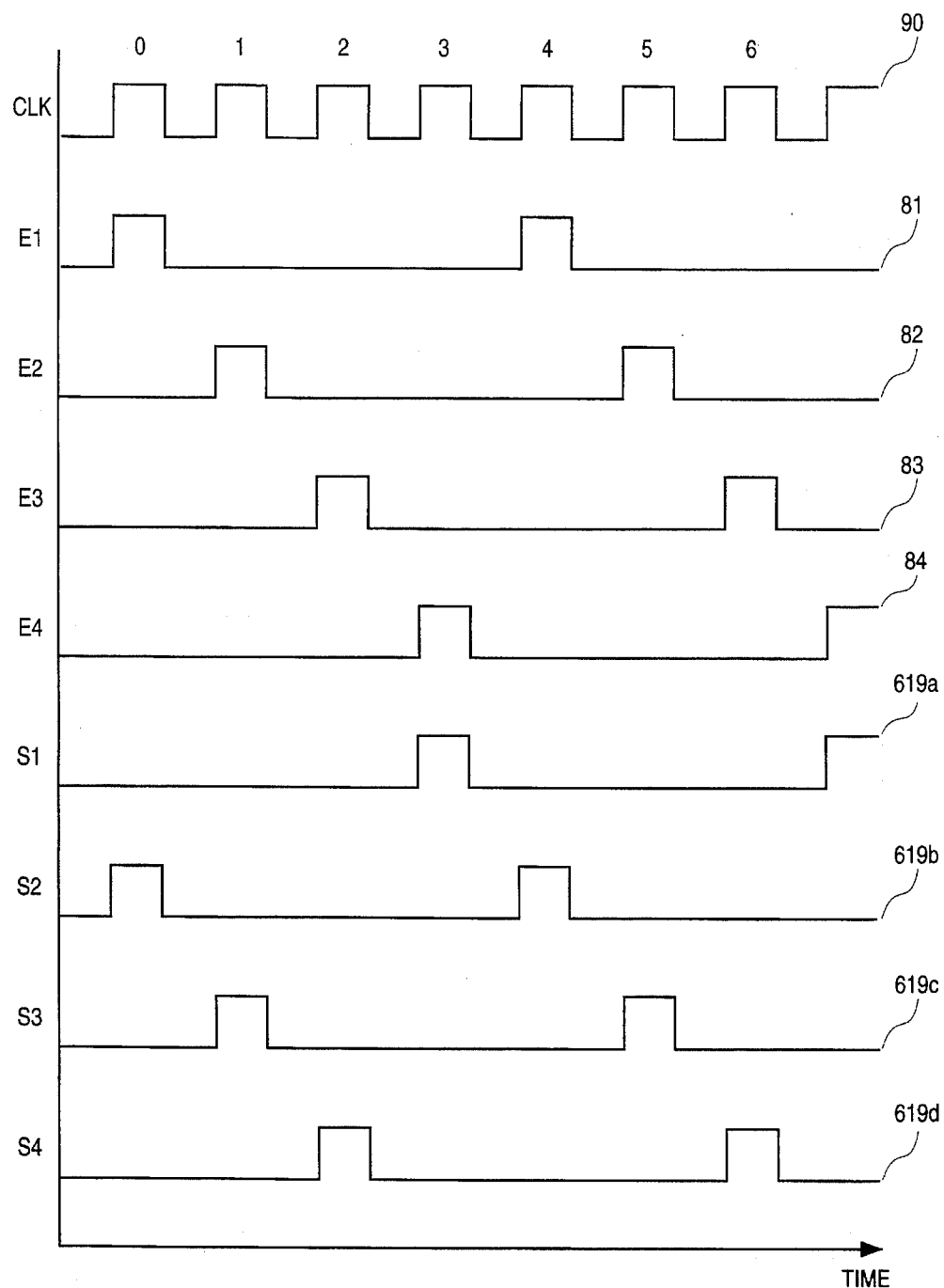
FIG. 5 is a timing diagram illustrating the state of the clocked enable lines (write enable) and of the clocked select lines of the multiplexer (read enable) for the embodiment of FIG. 4 wherein all four latches (stages) are selected.

FIG. 5 illustrates a timing diagram of the above described signals for the circuit 50a of FIG. 4 when all four latches 70a–70d are programmed to be operative. The top signal is associated with line 90 and represents the sampling or read frequency. Approximately six complete clock cycles are shown. The second signal is a write enable signal for latch 70a and is associated with line 81. This signal enables latch 70a every four clock cycles. The write enable lines for latches 70b–70d are also shown as signals three to five and are associated with lines 82 to 84, respectively. As shown, the write enable signals individually enable a latch (or stage) to receive a status bit every four clock cycles but are staggered each by one cycle, so for any given clock cycle only one latch is enabled for a write.

As FIG. 5 also illustrates, mux select signals (S1–S4) are decoded (e.g., delayed) to render the enable signals (E1–E4). The enable lines (E1–E4), or "write enables," are generated from the select lines (S1–S4), or "read enables," so that a particular latch is written into just after it was previously read within the prior clock cycle. Therefore, at clock cycle 0, latch 70a is written to and select line S2 is high (over line 619b). This configuration will select latch 70b for reading. At cycle 1, latch 70b is written to and the mux receives S3 as high (over line 619c) indicating that latch 70c is read. At cycle 2, latch 70c is written to and mux 60 receives select signals with S4 high (over line 619d) indicating that latch 70d is read. Lastly, at cycle 3, latch 70d is written to and select lines indicate that latch 70a is read since S1 is high (over line 619a).

Since the circuit 50a is programmable, FIG. 6A, FIG. 6B, FIG. 6C and FIG. 6D illustrate the timing signals of the present invention in response to programming the circuit of FIG. 4 to operate one, two, three, or all four parallel latch stages. Signals L0 112 and L1 114 receive the input program signals.

FIG. 6A illustrates in graphical form the information of FIG. 5 and in addition, FIG. 6A indicates the inputs of mux 60 that are read from, particularly (e.g., Ia, Ib, Ic, and Id) for a given clock cycle. FIG. 6A illustrates the timing information for when all latches 70a–70d are programmed operative (e.g., input signals L0=1 and L1=1 of circuit 110 of FIG. 5). Row 601 illustrates the sample clock frequency (input 90). Rows 603, 605, 607 and 609 indicate the write enable signal lines for latches 70a–70d and a "W" indicates that for that given clock cycle, the enable line wrote data to its respective latch. Rows 611, 613, 615, and 617 indicate, by "R," the mux input selected by the mux 60 for output (e.g., a read) within a given clock cycle. Lastly, rows 619a–619d illustrate the required state of the select lines S1–S4 to accomplish the read enable signals. As shown, a particular latch is written to just after it was read from the mux 60. The embodiment depicted in the timing of FIG. 6A, as programmed with all latches active, provides three cycles of metastability settling delay.

FIG. 6B illustrates the embodiment of FIG. 4 wherein only three latch stages are programmed as operative (e.g., latches 70a–70c) and stage 70d is not used and signal lines are programmed L0=0 and L1=1. Circuit 120 only generates write enables (E1, E2 and E3) for latches 70a–70c. Likewise, mux 60 is selected to input only data from Ia, Ib, and Ic. Rows 603, 605, and 607 indicate the write enable signal lines for latches 70a–70c and a "W" indicates that for that given clock cycle the enable line wrote data to its respective latch. Rows 611, 613, and 615 indicate, by "R," the mux input selected by the mux 60 for output within a given clock cycle. Circuit 110 generates select lines S1–S3 so that signals E4, S4, and Id remain inactive. The embodiment depicted in the timing of FIG. 6B, as programmed with only three parallel latches active, provides two cycles of metastability settling delay.

FIG. 6C illustrates the embodiment of FIG. 4 wherein only two latch stages are programmed as operative (e.g., latches 70a–70b) and stages 70c and 70d are not used and signal lines are programmed L0=1 and L1=0. Circuit 120 only generates write enables (E1 and E2) for latches 70a and 70b. Likewise, mux 60 is selected to input only data from Ia and Ib. Rows 603 and 605 indicate the write enable signal lines for latches 70a and 7b and a "W" indicates that for that given clock cycle the enable line wrote data to the respective latch. Rows 611 and 613 indicate, by "R," the mux input selected by the mux 60 for output within a given clock cycle. Circuit 110 generates signals S1–S2 so that signals E3–E4, S3–S4, and Ic–Id remain inactive. The embodiment depicted in the timing of FIG. 6C, as programmed with only two parallel latches active, provides a single cycle of metastability settling delay.

Lastly, FIG. 6D illustrates the timing for the embodiment of FIG. 4 wherein only one latch is programmed as operative, 70a, and stages 70b–70d are not used and signal lines are programmed L0=0 and L 1=0. Circuit 110 generates signal S1 only so that signals E2–E4, S2–S4, and Ib–Id remain inactive. In this mode, there is no clock cycle settling time and the latch 70a is said to be transparent with respect to the input and output.

PROGRAMMABILITY OF SYNCHRONIZER

Typical synchronizers have an upper limit of clock frequency and signal frequency. The limitation is due to their fixed number of synchronizer stages and fixed amount of settling time. Operation above these limits results in more probable metastability failures. Predicting the required settling time for a given failure rate is difficult. Simulation values often grossly miss actual values due to the exponential relationship between failure rate and temperature, voltage, and settling time. Often a conservative design becomes an unacceptable implementation due to modeling inaccuracies and miscalculations. Therefore, programmable settling time offered by the present invention allows an easy increase in settling time if the default settling time is not enough. Programmability of settling time also allows reducing settling time for minimum latency when using a slower sampling clock frequency. It is appreciated that using a programmable parallel synchronizer 50 of the present invention, the same circuit could be used as an interconnect between various systems of different clock speeds and individually programmed to meet the particular environment of each synchronizer.

ASYNCHRONOUS INTERCONNECT

Figure 7:
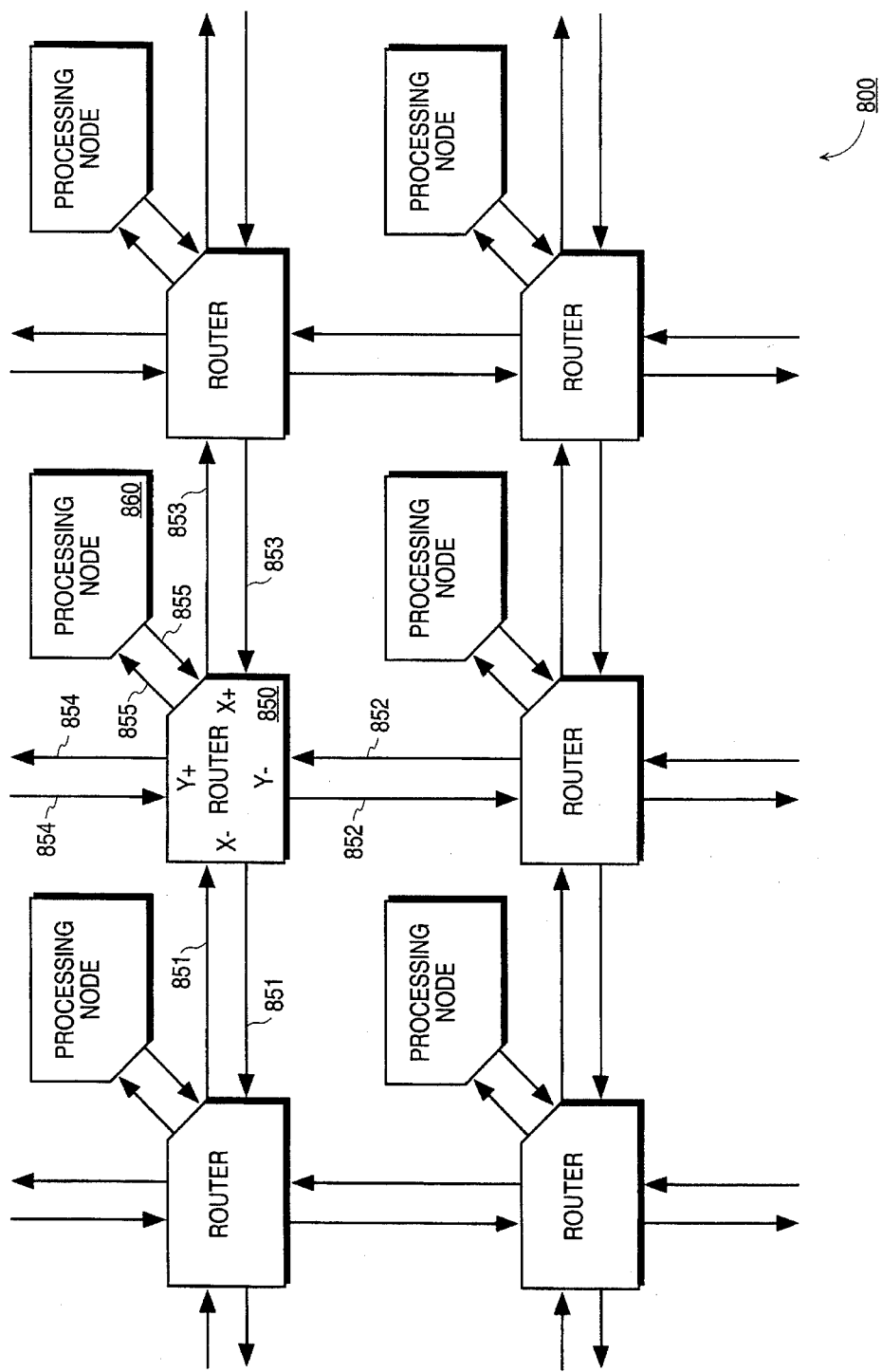
FIG. 7 illustrates an exemplary parallel processing environment for use of the parallel synchronizer interface of the present invention.

FIG. 7 illustrates an exemplary environment for operation of the present invention parallel programmable synchronizer within an interconnect between asynchronous systems. FIG. 7 illustrates a topology 800 of a parallel processing system having multiple computer processing systems or nodes 850 interconnected in a mesh configuration via a router network comprised of point-to-point communication routers 850. This exemplary parallel processing network 800 is described in more detail in copending patent application Ser. No. 08/296,019 entitled Point-to-Point Phase-Tolerant Communication, by Self, et. al., filed on Aug. 25, 1994 and assigned to the assignee of the present invention. The routers 850 are used to transfer information to different nodes 860 or outside of the total system 800. The nodes 860 and routers 850 are coupled via a pair of uni-directional communication buses 855. Routers 850 are coupled together via buses 851–854 to provide uni-directional point-to-point communication between the routers via different communication channels. The nodes 860 can be operating at different and unrelated clock frequencies as compared to the routers 850. Therefore, the routers 850 and nodes 860 are truly asynchronous. The present invention synchronizer interconnect is utilized, in this example, to provide an information interconnection between a given processor node 860 and a router 850. The interconnection circuitry of the present invention can be placed within the router 850, within the node 860, or separately.

Figure 8:
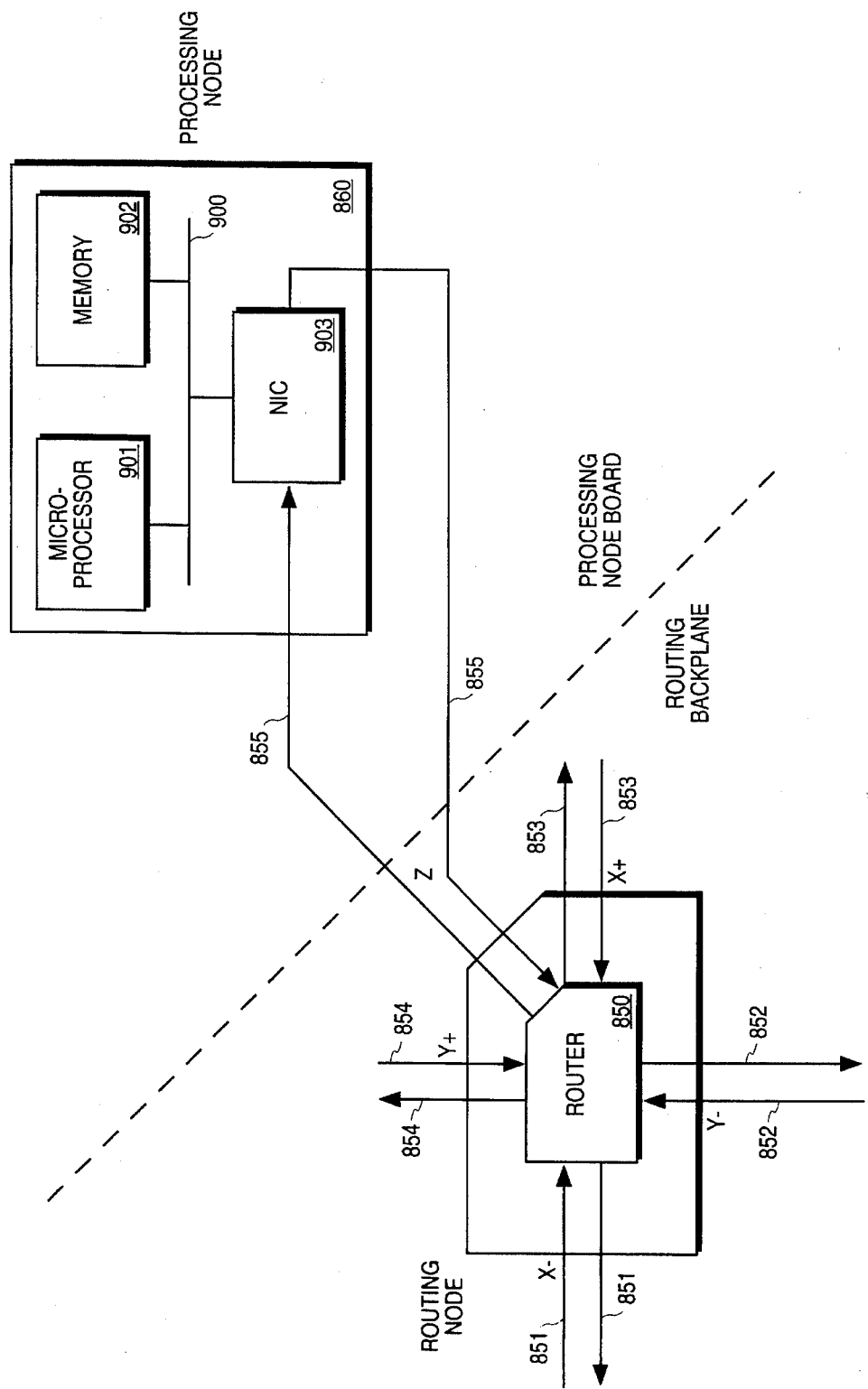
FIG. 8 illustrates a logic diagram of an environment of the parallel synchronizer interface of the present invention in further detail.

FIG. 8 illustrates the communication interconnection between a router 850 and a given node 860 in more detail. The node 860 is shown to comprise a processor 901, a memory 902 coupled to the processor 901 and a network interface component (NIC) 903, all coupled via bus 900. The communication interconnect circuitry for this system is contained within the NIC 903. The NIC 903 contains the parallel programmable synchronizer 50 of the present invention 50a. In this example, the interconnect 903 is located within the processor node 860 but could also be located in the router 850 or separate from both. The NIC 903 is operable to provide a fully asynchronous interface between the processor node 860 and the router 850. It is appreciated that the NIC 903 is coupled via two separate uni-directional communication buses 855 between the node 860 and the router 850. Different buses are used for transferring and receiving information. One bus is used for transferring information from node 860 to router 850 and another bus is used for transferring information from router 850 to node 860. An exemplary operating frequency of node 860 is 200 MHz or more.

Figure 9:
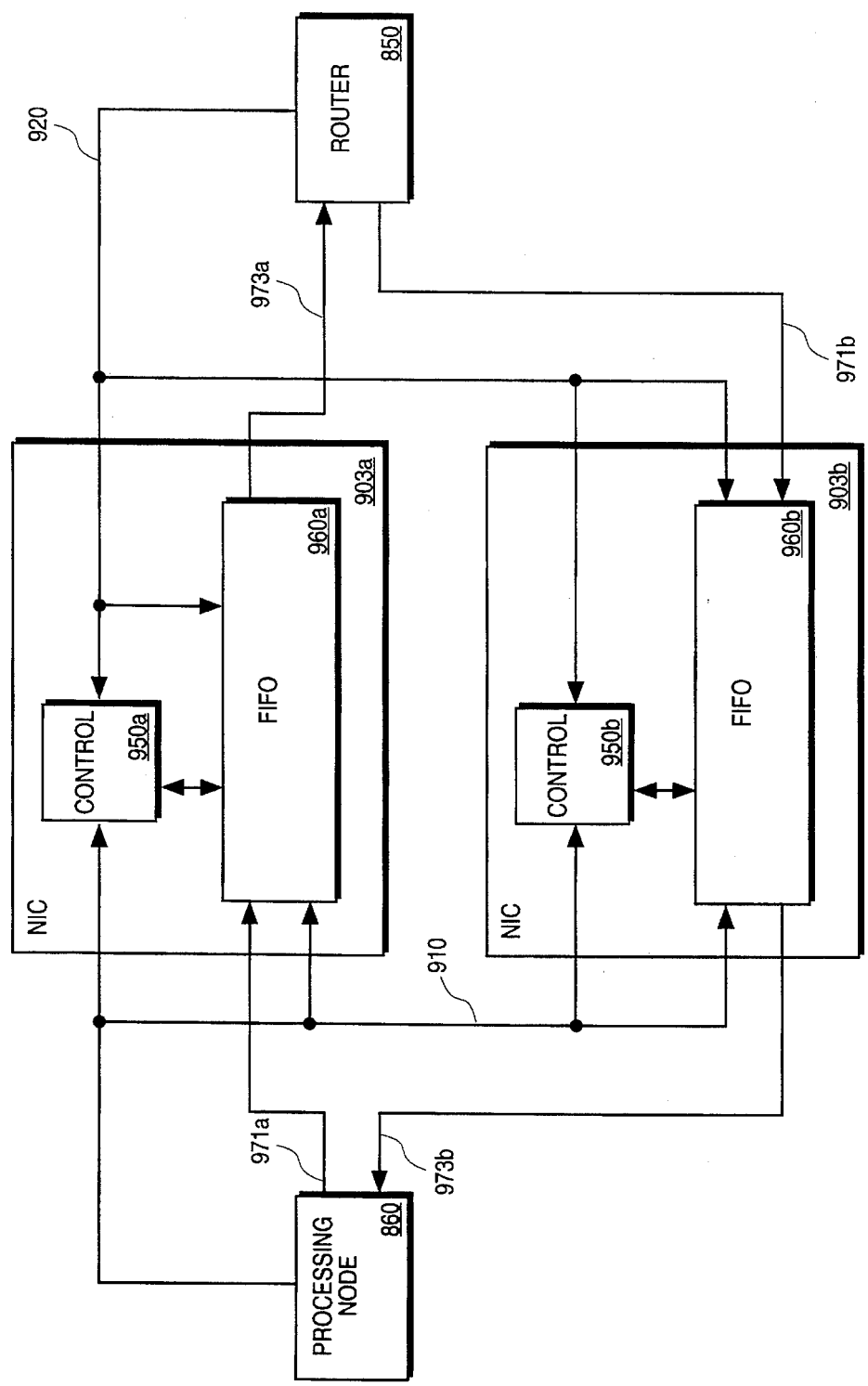
FIG. 9 is an illustration of a logic diagram of an environment of the parallel synchronizer wherein two interfaces are utilized to couple both processor systems using a pair of uni-directional bus lines.

FIG. 9 illustrates a logical block diagram of the interconnection between system (router) 850 and system (processor node) 860 for each uni-directional bus. The pair of uni-directional buses 855 is shown in more detail as buses 971a and 973b (for communication to system 850) and buses 971b and 973b (for communication to system 860). As shown, the NIC 903 is comprised of two separate logic blocks 903a and 903b. NIC 903a is used for communication from system 860 to system 850 and will be further explained in detail. NIC 903b is analogous in circuitry to NIC 903a, however, NIC 903b is used for communication from system 850 to system 860. NIC 903a comprises a control circuit 950a and a FIFO RAM 960a having addressable locations. The control circuit 950a, as will be described in further detail, comprises write pointers, read pointers, status flags, full flags and empty flags, among other elements to control the flow of information there through. The control unit 950a is coupled to the FIFO 960a and contains the parallel programmable synchronizers 50.

The write clock for NIC 903a is sent over line 910 and is generated from system 960. The read clock for NIC 903b is also signal 910. The write clock for NIC 903b is signal 920 which is also the read clock for NIC 903a. Clock 910 and clock 920 are coupled to the control units 950a and 950b and also coupled to FIFOs 960a and 960b. The data path output from system 860 is bus 971a and the data path into system 860 is bus 973b. The data output from system 850 is over bus 971b and the data path input to system 850 is over bus 973a.

Figure 10:
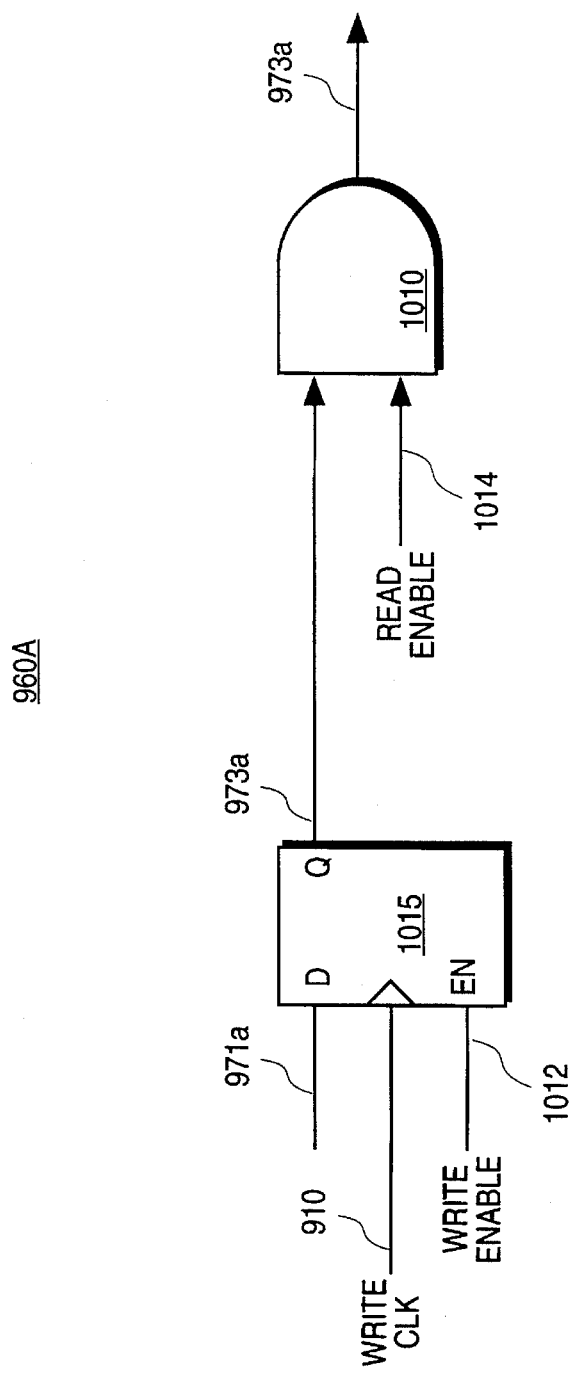
FIG. 10 is an illustration of a single cell of the FIFO RAM of the present invention.

FIG. 10 illustrates a cell of a location of the FIFO RAM 960a although a number of different FIFO designs with asynchronous read and write can operate within the scope of the present invention. The latch 1015 receives a signal input from data path 971a for a bit of data and is clocked via write clock 910. The cell is enabled (e.g., addressed) by write enable signal 1012 generated from the write pointer (to be discussed). The output Q of the latch 1015 is fed to an AND gate 1010 which also receives a read enable signal 1014, generated from the read pointer (to be discussed). The output of the AND gate 1010 is fed over data path 973a. Each cell of the FIFO RAM 960a is therefore separately addressable by the write enable 1012 and the read enable 1014. The cells of FIFO RAM 960b are analogous (except with respect to the input and output bus identifications). An exemplary size of the FIFO RAM 960a is 20 words deep (each cell containing only one bit of the word) but can be of a number of different sizes within the scope of the present invention.

Figure 11:
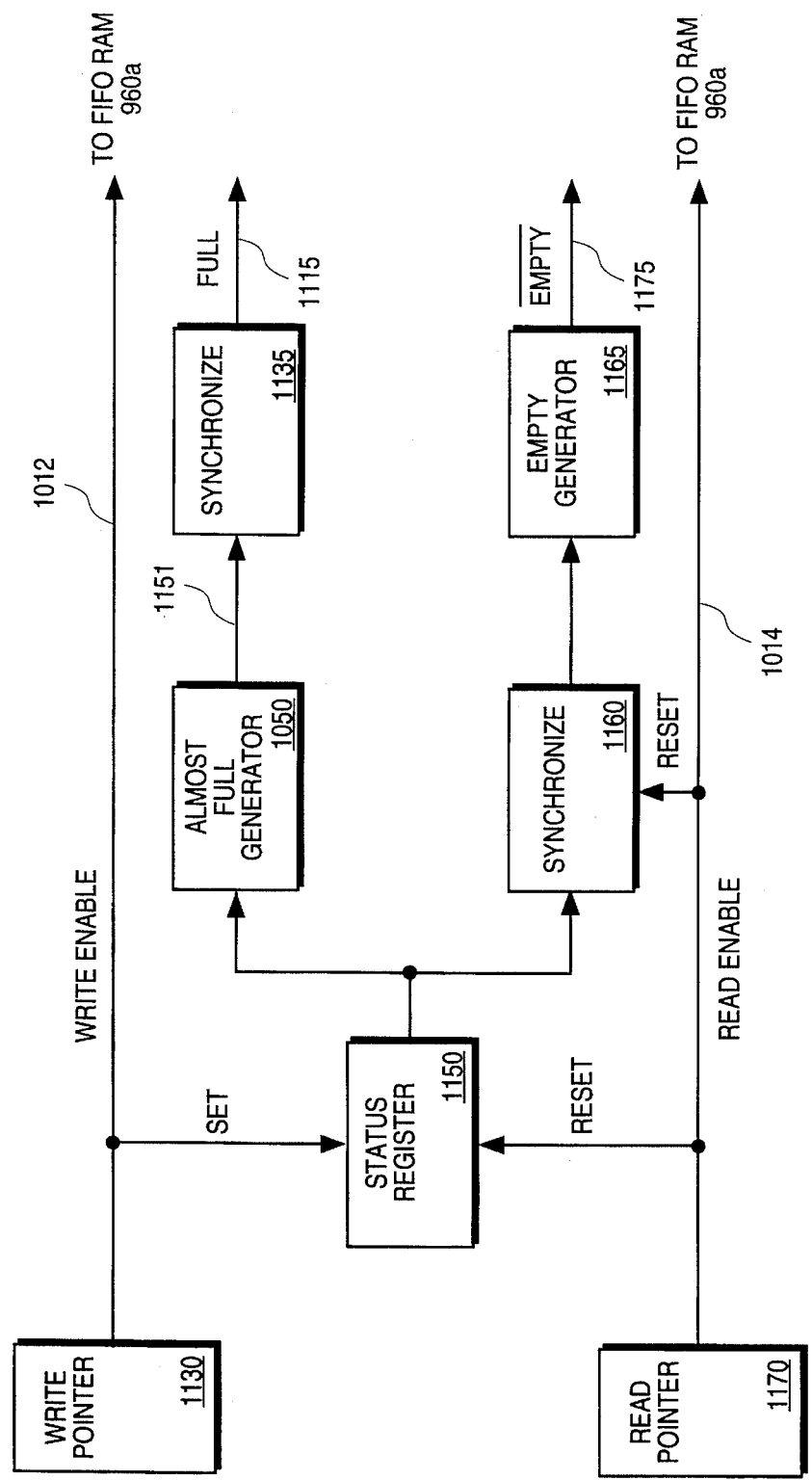
FIG. 11 is a logical block diagram of a control unit of the parallel synchronizer interface of the present invention.

FIG. 11 illustrates the control block 950a of the NIC 903a of the present invention in more detail. A write pointer 1130 generates write enable signals (which can be used to address one of the 20 word storage locations) for the FIFO RAM 960a over bus 1012. The write pointer 1130 contains a bit that cycles through a register to indicate a particular address of the FIFO 960a. The write enable signals 1012 also set a bit in the status register 1150 indicating that data has been written into the FIFO RAM 960a at a particular address. The read pointer 1170 generates read enable signals 1014 for the FIFO 960a and these signals also reset the status register 1150 indicating that data has been read from a particular address of the FIFO RAM 960a. The read pointer 1170 contains a bit that cycles through a register to indicate a particular address of the FIFO 960a. The same is true with respect to control unit 950b and FIFO 960b.

The status register 1150 indicates the contents of valid data within the FIFO RAM 960a. The status register 1150 is composed of set/reset latches, one for each word of the FIFO RAM 960a. The setting of these latches is synchronous with the read clock 920 and the resetting of these latches is a true asynchronous reset and has no relationship with the clock. Set and reset do not occur at the same time on the same latch because of the delay caused by the empty synchronizer 1160 and full synchronizer 1135, which will be discussed further below.

The status register 1150 of FIG. 11 is evaluated for an almost-full condition (total number of status bits that are set are greater than some preset amount) by circuit 1150. The almost-full signal 1151 is synchronized by circuit 1035 with the write clock 910 and emerges as the full flag 1115. The synchronizer circuit 1135 contains a parallel programmable circuit 50 of the present invention and the sample clock is the write clock 910 (see FIG. 12). The assertion and deassertion of the full-signal 1115 are both synchronized to the write clock 910. The full signal 1115 is then fed back to the write circuitry (system 860) to indicate a possible halt in data flow. The status bits of the status register 1150 (as will be shown below) are individually synchronized to the read clock 920 by circuit 1160. Circuit 1160 contains a separate synchronizer 50 of the present invention for each status bit within status register 1150. Circuit 1165 generates an empty flag (here indicated as a not empty flag). As a result, assertion of the not empty flag 1175 ("assertion of the empty flag") is synchronized to the read clock 920 and deassertion of the not empty flag 1175 is immediate since the read select line 1014 resets the corresponding status register bit after a read of a particular FIFO word. Logic to render the not empty flag 1175 is within block 1165.

The empty flag 1175 (not empty in this example) indicates that either data is ready to be read or data should not be read. The assertion (=1) of the not empty flag 1175 is synchronized to make sure data is not read until the proper settling time has elapsed. The deassertion (=0) of the not empty flag 1175 is done immediately to prevent a read from occurring when no data is available. As will be described further below, asynchronous reset of individual synchronizers within circuit 1160 of the present invention provides immediate not empty flag 1175 deassertion to prevent an over-read situation.

Figure 12:
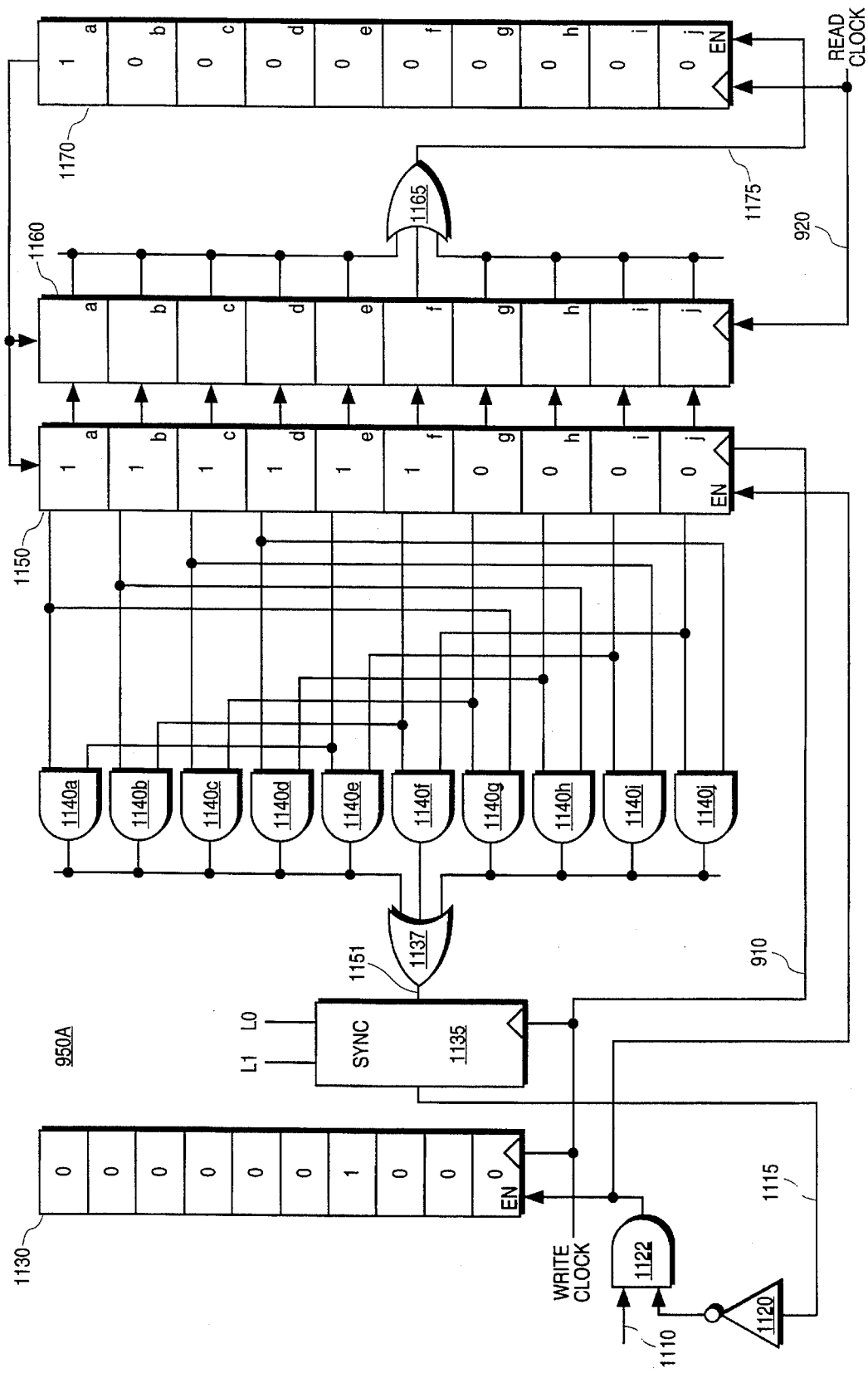
FIG. 12 is a circuit level block diagram of the control unit of the parallel synchronizer interface of the present invention and the empty flag generation thereof.

FIG. 12 illustrates the control block 950*a* of the present invention in more detail. For illustration purposes, the control logic for a FIFO RAM 960*a* having 10 entries is illustrated. The parallel programmable synchronizer 50 of the present invention can be implemented in different circuit locations of the control block 950*a*. Circuit 50 can be implemented, as discussed above, within the almost-full synchronizer 1135 also called the write synchronizer 1135 wherein the sample clock being the write clock 910. Circuit 50 can also be implemented in circuit 1160 to synchronize each of the status register bits (a–j) within status register 1150. In other words, circuit 50 can be implemented as each individual synchronizer (a–j) within the not empty flag synchronizer 1160. In this case the sample clock would then read clock 920.

WRITE CONTROL LOGIC

FIG. 12 illustrates the write pointer 1130 having one bit set to indicate the FIFO RAM 960*a* entry of the recently stored information. This pointer 1130 is used to write-address the FIFO RAM 960*a* and will also be used to set a corresponding bit (a–j) of the status register 1150. The write pointer is cycled by one for each write into the FIFO RAM 960*a* and is clocked by the write clock 910. When not enabled by the output of AND gate 1122, the write pointer 1130 will not cycle. When data is not being written, the write pointer 1130 points to the next available entry. While the cycle of the write clock 910 is low, the data is written into the FIFO 960*a*. On the next rising edge of clock 910, a 1 is written in the status register 1150 at the appropriate bit position corresponding to the FIFO entry written and the write pointer 1130 is advanced. Two signals must be available for the write pointer 1130 to be advanced. The first signal 1110 is generated by the write circuitry (system 860) and indicates that valid data is available for transfer. The second is the inverted full signal 1115 from inverter 1120 which indicates that the FIFO RAM 960*a* is not full. If the FIFO 960*a* is full, as indicated by the full flag 1115, the write circuitry (system 860) does not send more valid data; in one embodiment, the signal 1110 is deasserted until after the full 1115 is deasserted.

Logic AND gates 1140*a*–1140*j* sense for a particular sequence of bits (e.g., separated by a predetermined number of entries) of the status register 1150 that indicate an almost-full condition. Since this pattern or sequence can occur within a variety of positions, there is a network of logic gates 1140*a*–1140*j* that output to a single OR circuit 1137 that indicate an almost-full condition over line 1151. Only the first and last bit of the sequence are checked, the sequence length being determined based on the number of settling time cycles programmed by circuit 1135. For example, AND gate 1140*a* checks bits a and e of register 1150, AND gate 1140*b* checks bits b and f, and AND gate 1140*c* checks bits c and g. Almost-full rather than full is examined in order to prevent an overflow condition since the reading and writing of the status register bits (a–j) of register 1150 is asynchronous. The output of each AND gate 1140*a*–1140*j* is sent to the input of OR gate 1137. The output 1151 of OR gate 1137 is then fed into synchronizer 1135 as the input status bit. Circuit 1135 can be programmed by lines L0 and L1 to have variable settling times. Circuit 1135 is synchronized to the write clock 910 and the output 1115 of circuit 1135 is the full flag and is fed to the inverter 1120.

According to the example of FIG. 12, the synchronized full flag 1115 is generated from an almost-full flag 1151, when 5 sequential status register bits are set. The almost-full flag 1151 is synchronized by circuit 1135 (delayed n cycles) and then becomes the full flag 1115. The full flag 1115 indicates the following: (1) when 1, indicates that n cycles earlier at least 5 of the 10 FIFO stages contained valid data; and (2) when 0, indicates that n cycles earlier less than 5 stages contained valid data. It is appreciated that the number n, above, indicates the number of cycles of synchronization settling time of circuit 1135 and is determined by the synchronizer configuration programmed into circuit 1135 by lines L0 and L1.

READ CONTROL LOGIC

A read occurs every read clock cycle 920. A read can be prohibited by stopping the read clock 920 or by externally forcing the not empty flag 1175 (deasserting the not empty flag in this example). The rising edge of the read clock 920 advances the read pointer 1170 which provides the read enable for the FIFO 960*a*. While the read clock 920 is high, the previously read status register bit (a–j) of 1150 and associated synchronizer (a–j) of 1160 is cleared asynchronously. When data is not being read, the read pointer 1170 indicates the next available FIFO entry. Each bit (a–j) of the status register 1150 is input to an individual synchronizer 1160 of the present invention parallel programmable synchronizer circuit 50 design. This is done to prevent the last data word from being left unread by the FIFO 960*a*. Each synchronizer 1160(*a–j*) is programmable by program lines not shown.

The output of the synchronizers (a–j) of block 1160 are fed to an OR gate 1165 that generates the not empty signal 1175. Using this mechanism, the deassertion of the not empty signal 1175 (assertion of empty) is immediate and not synchronized to the read clock 920 due to the reset of the synchronizer and status register bit upon a read enable associated with that corresponding entry of the FIFO 960a. The assertion of the not empty signal 1175 (deassertion of empty) is synchronized to the read clock 920. The not empty signal 1175 is the enable signal (enabled when high) for the write pointer 1170 which will not cycle if the FIFO 960a is empty.

READ-TO-FIFO EMPTY OPERATION

If only one status register bit (a–j) of 1150 is set, it is passed through its synchronizer (a–j) of 1160 and n cycles later (depending on the programmable settling time, n) present at the OR gate 1165. The not empty flag 1175 is asserted (=1) and the data is read on the next rising edge of the read clock 920. When data is read, the previous status register bit 1150(a–j) is cleared and all stages of the corresponding synchronizer 1160(a–j) are also cleared. Therefore, when the last word is read from the FIFO 960a, the not empty flag 1175 is de-asserted (=0) immediately and does not have to wait while an "almost-empty" signal is passed through a synchronizer. This configuration of the present invention avoids the following scenario. Assume the de-assertion of the not empty flag 1175 was not immediate but rather an OR'ed signal output was sent into a single read synchronizer circuit (similar to the write synchronizer circuit 1135 and logic configuration involving gate 1137 and gates 1140a–1140j of the present invention). Then this would allow a word to be read from the FIFO 960a at a latency equal to the read synchronizer's settling time. However, when reading the last word from the FIFO 960a, the not empty signal would not be deasserted until some time after the FIFO 960a was actually empty. This would cause over-reading of the FIFO 960a.

Alternatively, assume the status register bits 1150(a–j) are ANDed together to indicate that a segment of the FIFO 960a is almost-empty. This signal is then ORed with all the other signals to create an "almost-empty" signal similar to the almost-full signal 1151 output from circuit 1137 of FIG. 12. The almost-empty signal is passed through a synchronizer and becomes the full flag on the other end. This scenario works well when the FIFO 960a is being emptied. The almost-empty signal is generated to indicate that in so many clock cycles the FIFO 960a could become empty. Since the non-empty FIFO 960a is read every cycle by definition, the FIFO 960a would in fact become empty in the allotted number of cycles. However, when the FIFO 960a is already empty, and only one word is loaded, this one word would not be read. Only one bit set in the status register would never trigger the almost-empty signal. The word would have to sit in the FIFO 960a until enough words are loaded to trigger the almost-empty signal. For this purpose, and the one described above, a separate synchronizer 1160 (a–j) is used for each status register bit 1150 (a–j) according to the present invention.

If the FIFO 960a is empty, the read pointer 1170 is not incremented and the last outgoing data is read again, in such case a read_ok_bit (not shown) indicates that no valid data is ready for read. The circuit of FIG. 12 is such that the write pointer 1130 and the read pointer 1170 point to the same FIFO entry when the FIFO is empty and the written data is immediately seen on the read bus 973a since the FIFO 960a is a transparent latch.

WRITE-TO-NOT EMPTY OPERATION

The following example describes the sequence of events when one data word is written into an empty FIFO 960a. When data is written into a stage of the FIFO 960a, the corresponding status register bit 1150(a–j) is set immediately by the write pointer 1130. The status register bit value passes through a synchronizer 1160(a–j) and sometime later appears as the not empty flag 1175. The not empty flag 1175 unmasks the read_ok_bit valid data bit (not shown) and allows data to be read on the rising edge of the next read clock 920. After the rising clock edge, the read pointer 1170 points to the next status register bit 1150(a–j) for read. Also, the previous status register bit 1150(a–j) is cleared and all stages of the synchronizer 1160(a–j) are cleared of the synchronizer that is associated with that previous bit. The not empty flag 1175 is immediately de-asserted to indicate an empty FIFO 960a. The current status register bit pointed to by the read pointer 1170 is not set and does not pass through the synchronizer 1160 as a possible not empty signal. The read pointer 1170 waits in this position until data is written into the current stage of the FIFO 960a.

WRITE-TO-FULL OPERATION

The following example describes the sequence of events when a data word is written into the FIFO 960a that is about to produce a full flag 1115. Assume the FIFO 960a is close to half full. When the next data is written into a stage of the FIFO 960a, the corresponding status register bit 1550(a–j) is set immediately. The status register bits 1550(a–j) are sampled with AND-OR logic (AND gates 1140(a–j) and OR gate 1137) and a sequence of stages are found to contain valid data. This generates an "almost-full" signal (output 1151 from gate 1137) that is passed through the synchronizer 1135. By the time the almost-full signal 1151 passes through the synchronizer 1135 and comes out as the full flag 1115, the remainder of the stages in the FIFO 960a could have been written (if data is written on every write clock cycle). Whether the FIFO 960a is full or not quite full, the full flag is generated and transmitted to the neighboring system (860) that is sending incoming data. The neighboring system 860 should stop transmitting data until the full flag 1115 is deasserted. Only two data words left in the pipe can be written into the FIFO 960a without the possibility of over-writing data.

EXEMPLARY FIFO DEPTH

According to an exemplary configuration of the interconnect of the present invention, the nominal FIFO depth can be computed. Since the synchronizer 1135 may have as many as eight stages (in one embodiment) there should be at least an eight word depth in the FIFO 960a. Since it is not known when the synchronizer 1135 caught the valid bit from OR gate 1137, there needs to be another word. Since the read pointer 1170 asynchronously clears the previous status bit, another word is required. Because the writing unit (860) may need to send another word that is in the pipeline, the FIFO 960a should have still another word for padding. The subtotal depth is 11 words. The almost-full signal 1151 can be based on any depth, but for maximum through-put, data must be able to be read as fast as written. In order to accomplish this, the number of stages between the almost-full flag AND gates 1140a–1140j needs to be greater than the delay time of the synchronizer 1135. Since the synchronizer 1135 can be up to 8 clock cycle delays long, the almost-full AND gates 1140a–1140j should encompass at least 9 stages. The subtotal FIFO depth to satisfy the read pointer 1170 and almost-full flag is 9. The minimum FIFO depth therefore is 9+11 or 20 under this embodiment. However, this is based on nothing being written or read at the same time, so the depth could be somewhat smaller.

The preferred embodiment of the present invention, a fully asynchronous parallel programmable synchronizer and interface using same, is thus described. While the present invention has been described in particular embodiments, it should be appreciated that the present invention should not be construed as limited by such embodiments, but rather construed according to the below claims.

What is claimed is:

1. A circuit for synchronizing an input signal according to a sample clock, said circuit comprising:

a first latch for receiving said input signal and clocked by said sample clock;

a second latch for receiving said input signal and clocked by said sample clock;

a third latch for receiving said input signal and clocked by said sample clock;

a multiplexing circuit for receiving outputs originating from said first latch, said second latch and said third latch, said multiplexing circuit for outputting one of said outputs for sampling in response to read enable signals;

write enable circuitry for generating write enable signals, said write enable signals coupled to said first latch, said second latch and said third latch; and wherein for a given clock cycle, said write enable signals enable a single one of said first, second and third latches for receiving said input signal and said read enable signals enable another single one of said first, second and third latches for outputting through said multiplexing circuit.

2. A circuit as described in claim 1 further comprising read enable circuitry for generating said read enable signals wherein said read enable signals are functions of said write enable signals.

3. A circuit as described in claim 2 wherein said write enable signals and said read enable signals are generated such that a given latch of said latches is written into one sample clock cycle after said given latch was read from through said multiplexing circuit.

4. A circuit as described in claim 1 wherein said write enable circuitry receives programmable input signals and responsive thereto generates said write enable signals such that one or more of said latches becomes unused to provide programmable settling time.

5. A circuit as described in claim 4 wherein said circuit provides two sample clock cycles of metastability settling time when said first latch, said second latch, and said third latch are programmed to be used and wherein said circuit provides one sample clock cycle of metastability settling delay when said first latch and said second latch are programmed to be used.

6. A circuit for synchronizing an input signal according to a sample clock, said circuit comprising:

a plurality of n latches, each latch for receiving said input signal in parallel and each latch clocked by said sample clock in parallel;

a multiplexing circuit for receiving n outputs originating from said plurality of n latches, said multiplexing circuit responsive to read enable signals for outputting one of said n outputs for sampling;

write enable circuitry for generating write enable signals, said write enable signals coupled to said plurality of n latches; and wherein for a given sample clock cycle said write enable signals enable a single one of said plurality of n latches for receiving said input signal and said read enable signals enable another single one of said plurality of n latches for outputting through said multiplexing circuit.

7. A circuit as described in claim 6 further comprising read enable circuitry for generating said read enable signals wherein said read enable signals are generated as functions of said write enable signals.

8. A circuit as described in claim 7 wherein said write enable signals and said read enable signals are generated such that a given latch of said plurality of n latches is written into one sample clock cycle after said given latch was read from through said multiplexing circuit.

9. A circuit as described in claim 6 wherein said write enable circuitry receives programmable input signals and responsive thereto generates said write enable signals such that one or more of said plurality of n latches becomes unused to provide programmable settling time.

10. A circuit as described in claim 9 wherein said circuit provides 4c-1 sample clock cycles of metastability settling time for every x number of latches programmed to be used by said write enable circuitry.

11. A synchronizer having programmable metastability settling time for synchronizing an input signal according to a sample clock, said synchronizer comprising:

a plurality of n latches, each latch for receiving said input signal in parallel and each latch clocked by said sample clock in parallel;

a multiplexing circuit for receiving n outputs originating from said plurality of n latches, said multiplexing circuit responsive to read enable signals for outputting one of said n outputs for sampling; write enable circuitry for generating write enable signals, said write enable signals coupled to said plurality of n latches, wherein said write enable circuitry receives program signals and in response thereto generates said write enable signals such that x number of latches, of said plurality of n latches, are used wherein x is equal to or less than 4c; and wherein for a given sample clock cycle, said write enable signals enable a single one of said plurality of n latches for receiving said input signal and said read enable signals enable another single one of said plurality of n latches for outputting through said multiplexing circuit.

12. A synchronizer as described in claim 11 further comprising read enable circuitry for generating said read enable signals wherein said read enable signals are functions of said write enable signals.

13. A synchronizer as described in claim 12 wherein said write enable signals and said read enable signals are generated such that a given latch of said plurality of n latches is written into one sample clock cycle after said given latch was read from through said multiplexing circuit.

14. A synchronizer as described in claim 11 wherein said circuit provides 4c-1 sample clock cycles of metastability settling time for every x number of latches programmed to be used by said program signals.

15. A system including a synchronizing circuit for synchronizing an input signal according to a sample clock, said system comprising:

a writing system for writing said input signal for transmission, said writing system synchronized to a write clock;

a reading system for reading said input signal synchronized to said sample clock;

said writing system coupled to said synchronizing circuit and said reading system coupled to said synchronizing circuit wherein said write clock and said sample clock are asynchronous; and said synchronizing circuit comprising:
(a) a plurality of n latches, each latch for receiving said input signal in parallel and each latch clocked in parallel by said sample clock;
(b) a multiplexing circuit for receiving n outputs originating from said plurality of n latches, said multiplexing circuit for outputting one of said n outputs for sampling according to read enable signals;
(c) write enable circuitry for generating write enable signals, said write enable signals coupled to said plurality of n latches; and
(d) wherein for a given sample clock cycle, said write enable signals enable a single one of said plurality of n latches for receiving said input signal and said read enable signals enable another single one of said plurality of n latches for outputting through said multiplexing circuit.

16. A system as described in claim 15 further comprising read enable circuitry for generating said read enable signals wherein said read enable signals are generated as functions of said write enable signals.

17. A system as described in claim 16 wherein said write enable signals and said read enable signals are generated such that a given latch of said plurality of n latches is written into by said writing system one sample clock cycle after said given latch was read from through said multiplexing circuit by said reading system.

18. A system as described in claim 15 wherein said write enable circuitry receives programmable input signals and responsive thereto generates said write enable signals such that one or more of said plurality of latches becomes unused to provide programmable metastability settling time.

19. A system as described in claim 18 wherein said synchronizing circuit provides 4c-1 sample clock cycles of metastability settling time for every x number of latches programmed to be used by said write enable circuitry.

* * * * *